United States Patent [19]
Said

[11] Patent Number: 4,677,787
[45] Date of Patent: Jul. 7, 1987

[54] APPARATUS FOR MOUNTING APPLICATION HEADS TO AN AGRICULTURAL IMPLEMENT

[76] Inventor: Ronald S. Said, 3223 E. 100 S., Hartford City, Ind. 47348

[21] Appl. No.: 661,108

[22] Filed: Oct. 15, 1984

[51] Int. Cl.$^4$ .............................................. A01G 13/00
[52] U.S. Cl. ......................................... 47/1.5; 47/1.7; 172/687
[58] Field of Search ..................... 47/1.5, 1.7; 172/687, 172/688, 694, 198, 697, 692, 689, 634, 639, 620, 640, 776; 239/163, 164, 176

[56] References Cited

U.S. PATENT DOCUMENTS

| | | | |
|---|---|---|---|
| 3,368,344 | 2/1968 | West | 55/385 |
| 3,383,080 | 2/1966 | Frisbie | 248/354.5 |
| 3,488,061 | 1/1970 | Hansen et al. | 280/5 |
| 3,522,910 | 8/1970 | Pfeiffer et al. | 239/163 |
| 3,526,342 | 9/1970 | Pechacek | 222/176 |
| 3,815,830 | 1/1974 | Rowan | 239/163 |
| 3,874,593 | 4/1975 | Wilt | 239/166 |
| 3,905,523 | 9/1975 | Ahlers | 222/504 |
| 3,959,924 | 6/1976 | Allen | 47/1.7 |
| 4,019,278 | 4/1977 | McKudy | 47/1.5 |
| 4,187,638 | 2/1980 | Hardy et al. | 47/1.5 |
| 4,211,175 | 7/1980 | Van der Lely | 47/1.7 |
| 4,244,522 | 1/1981 | Hartwig | 239/148 |
| 4,342,366 | 8/1982 | Schenk et al. | 172/198 |

*Primary Examiner*—Robert A. Hafer
*Assistant Examiner*—Bradley M. Lewis
*Attorney, Agent, or Firm*—Jeffers, Irish & Hoffman

[57] ABSTRACT

Apparatus for mounting a plurality of substance distribution heads to an agricultural implement used in post-emergence and pre-emergence row crop farming operation. The apparatus includes an elongate support which is disposed generally transversely to the longitudinal direction of the row crops. The elongate support is receivable of a plurality of substance distribution heads. The apparatus further includes a mounting means for mounting the elongate support to the agricultural implement wherein the mounting means includes height adjustment means for adjusting the height of the elongate support relative to the row crops so that the generally vertical distance between the distribution heads and the row crops is selectively adjustable.

9 Claims, 11 Drawing Figures

APPARATUS FOR MOUNTING APPLICATION HEADS TO AN AGRICULTURAL IMPLEMENT

BACKGROUND OF THE INVENTION

The invention relates to a device for mounting equipment to an agricultural implement, and more particularly, to an assembly for mounting a plurality of application heads to an agricultural implement for the application of fertilizer, herbicides and other farm chemicals to row crops.

A row bander is a particular type of application head for applying agricultural chemicals to row crops. A row bander provides for selected directional spraying of agricultural chemicals on row crops. When a row bander is used in combination with an agricultural implement such as a row crop cultivator, one achieves desirable operating efficiencies.

For example, a farmer may plant row crops in 30 inches wide strips with each row separated by a 30 inches wide strip of soil. In applying an agricultural chemical such as weed killer, the row banders are adjusted so as to spray a path that is about 7 and ½ inches wide on each side of the row crop. The cultivator tines are positioned so as to cultivate the mediate 15 inch strip that exists between adjacent 7 and ½ inch wide paths sprayed with agricultural chemical. The result is that the 30 inches wide strip between adjacent rows is worked in one pass. A fuel savings occurs because the field can be worked in one pass to complete the job as opposed to two passes (one for cultivating, and one for applying agricultural chemicals). Further, because the cultivator is used to work the mediate 15 inch wide strip, only two 7 and ½ inch wide paths of chemical are required as opposed to a 30 inches wide path of chemical per row in the absence of cultivators. This results in a significant savings in the volume of chemical utilized to treat a particular field.

It is apparent that an application head such as a row bander provides meaningful operating advantages. However, heretofore there has been no advantageous way to mount row banders to an agricultural implement such as a cultivator. In the past, row banders have been mounted to the front of the tractor pulling the implement. There have existed several problems associated with the front mounting of row banders.

During the working of a field with a cultivator, the operator's attention is focused to the rear of the tractor where the cultivators are located. This is done to ensure that the cultivators work the area between the rows of crops rather than divert from the intended path resulting in destruction of the row crop. In a field that does not contain perfectly straight row crops, the fact that the operator's attention must be focused to the rear of the tractor results in the front mounted row banders sometimes not being correctly positioned relative to the row crop. The result of which is the inadequate application of agricultural chemicals to the row crops.

Another drawback with front mounting of row banders is the difficulty in viewing the spray heads while working the field. The advantage in viewing the spray heads during working is that any malfunction, such as clogging or the like, can be relatively quickly determined, and the problem corrected. This is not the case if the application heads are front mounted.

In using a front-mounted application head such as a rope wick, the chemical is wiped off onto the undesirable plant (e.g. ragweed, volunteer corn etc.) A drawback of the front-mounted, rope wick is that the tractor and implement contact the undesirable plants after the application of the chemical thereto. The disadvantage with this is that the tractor and implement are now contaminated with chemical, and consequently will wipe off some of the agricultural chemical on the row crops. This is an undesirable result.

There are times when row crops requiring the same agricultural chemical are of different heights. One primary cause of this is due to variations in planting dates. In the past, it has been difficult to adjust the height of the row bander or other application heads in the field. The result of this is a time consuming field operation to adjust the height or a return to the barn area where the operator is still faced with a relatively time-consuming operation to adjust the height of the row bander.

In certain situations in which a rope wick is utilized, it would be particularly desirable to be able to adjust the height of the rope wick above that of the crops. A particularly appropriate example is in the case of volunteer corn in a soy bean field. At the later stages of crop development, volunteer corn is significantly taller than the soy beans. The advantage of providing an assembly which would mount an application head such as a rope wick to a cultivator above the soy beans and at the same height as the corn would be great.

In some fields the presence of weeds and other unwanted plants is localized. It would thus be advantageous to provide in, addition to an improved mounting assembly, an agricultural chemical delivery system which would provide for the localized application of chemicals. This would provide the feature of some portions of a row crop field being cultivated only, and other portions of the row crop field being both cultivated and treated with agricultural chemicals.

In reduced tillage or so-called "no till" fields, the operator builds a ridge in the soil prior to planting. Typically this ridge is formed in the fall. In the spring when the field is planted, a planter is utilized to plant the seed in this ridge so that a field can be worked without any plowing, discing or the like. In a "no till" operation, it would be advantageous to provide an assembly for mounting application heads to a planter so that appropriate agricultural chemicals can be applied to the field as it is planted.

SUMMARY OF THE INVENTION

It is an object of the invention to provide an improved apparatus for mounting a plurality of application heads to an agricultural implement. In one form thereof, the invention is an apparatus for mounting a plurality of fluid spray heads to an agricultural implement wherein the implement is pulled by a tractor and used in row crop farming. The implement includes a frame that has a generally transversely disposed support member and a plurality of row crop working devices mounted to the frame support member.

The apparatus comprises a mounting fixture mounted at one end thereof to the frame support member. The other end of the mounting fixture extends rearwardly of the implement so as to be positioned to the rear of the row crop working devices. An elongate mount support is attached to the mounting fixture adjacent the other end thereof and is positioned rearwardly of the row crop working devices. A mount support is disposed generally transversely to the longitudinal direction of the row crops. The mount support is receivable of fluid spray heads in a spaced apart fashion along the length of the mount support whereby the spray heads and row crop working devices cooperate to perform a farming operation on the row crop. The mounting fixture further includes a height adjustment means for selecting the vertical position of all of the spray heads relative to the row crop.

In another form thereof the invention is an apparatus for mounting a plurality of substance distribution heads to an agricultural implement used in a post emergence row crop farming operation. The mounting apparatus comprises an elongate support bar disposed generally transversely to the longitudinal direction of the row crops. The elongate support is receivable of a plurality of substance distribution heads. The apparatus further includes a mounting means for mounting the elongate support to the agricultural implement. The mounting means includes height adjustment means for adjusting the height of the elongate support relative to row crops so that the generally vertical distance between the distribution heads and row crops is selectively adjustable.

In another form thereof the invention is an agricultural implement for cultivating and applying a reactive substance to generally longitudinally disposed rows of crops wherein the implement comprises an implement frame. The frame includes an elongate frame support. A plurality of spaced apart cultivator shovels for working the soil between the rows are mounted to the frame support. A tank is mounted to the implement frame. Each one of a pair of adjustable mounts having opposite ends is attached at one of the ends to the frame support. The other of the adjustable mount ends extends rearwardly so as to be positioned rearwardly of the cultivator shovels.

The implement further includes a spray head support which is attached to the adjustable mounts adjacent the other ends thereof. A plurality of spray heads are mounted to the spray head support in a spaced apart fashion so that each spray head is generally vertically disposed over its corresponding crop row. The implement further includes a substance delivery means for recirculatingly delivering the reactive substance between the tank and spray heads. Each of the adjustable mounts includes means for setting the generally vertical height of the spray heads relative to the crop rows.

The above mentioned and other features and objects of the present invention, and the manner of attaining them, will become more apparent and the invention itself will be best understood by reference to the following description of an embodiment of the invention taken in conjunction with the accompanying drawings.

DETAILED DESCRIPTION OF SPECIFIC EMBODIMENTS

Figure 1:
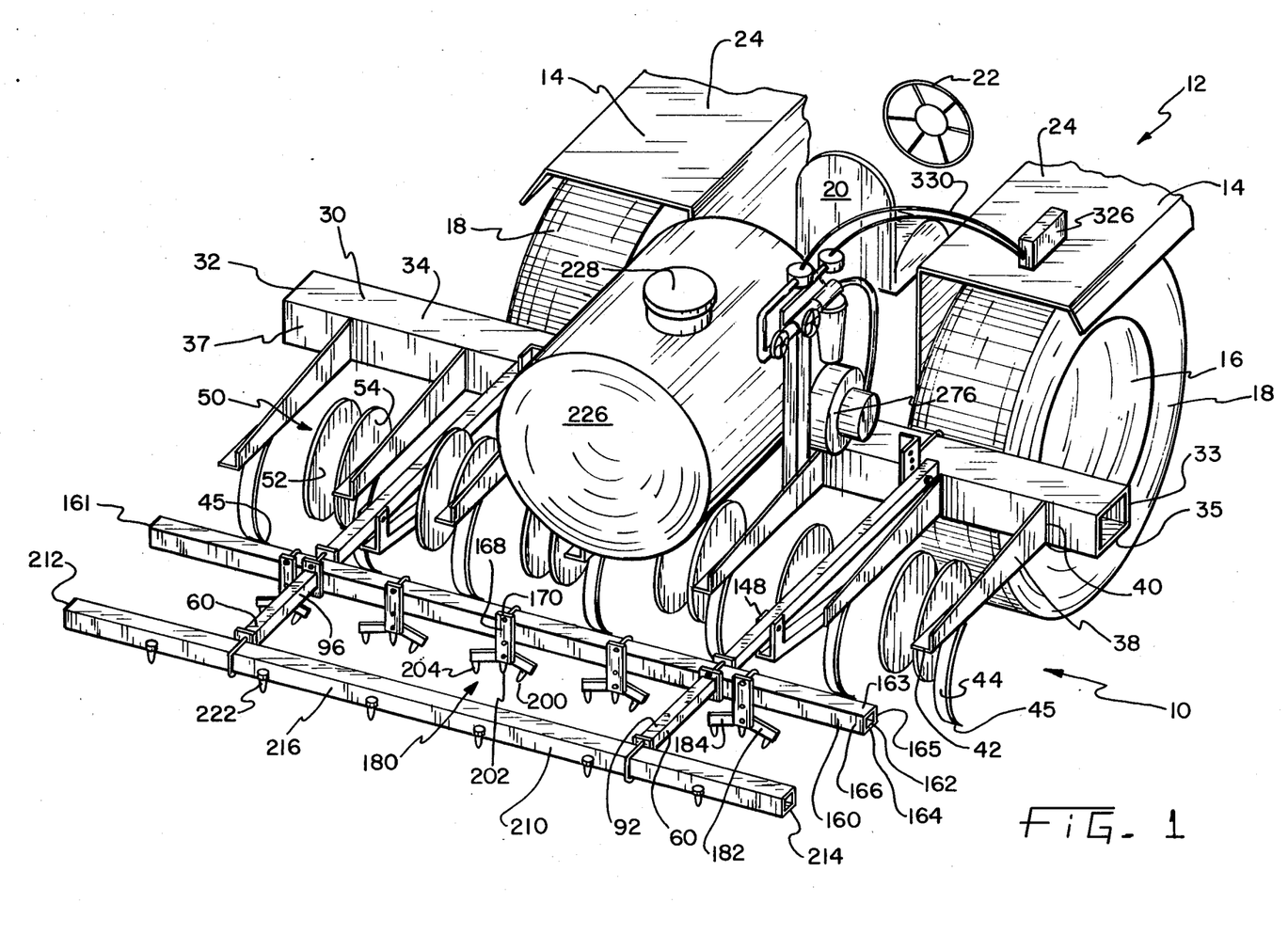
FIG. 1 is a rear perspective view of a specific embodiment of the invention (absent specific fluid connections between the tank and spray heads) mounting two sets of application heads to a cultivator which, in turn, is attached to a farm tractor.

Referring to FIG. 1, there is illustrated a cultivator generally designated as 10 detachably mounted to a tractor generally designated as 12. Tractor 12 includes oppositely disposed fenders 14 mounted to the chassis of the tractor. Tractor 12 further includes a pair of driven wheels 16 to which are mounted tires 18. A seat 20 is disposed between opposite fenders 14. A steering wheel 22 is positioned in front of seat 20. It can thus be appreciated that an operator sitting in seat 20 has relatively easy access to top surface 24 of each fender 14. In addition, the operator sitting in seat 20 would, of course, have operable access to steering wheel 22.

Referring to cultivator 10, it can be seen that cultivator 10 includes an elongate hollow rectangular support 30. Elongate support 30 includes opposite ends 32 and 33 as well as a top external surface 34, a bottom external surface 35, a front external surface 36, and a rear external surface 37. Cultivator 10 further includes a plurality of L-shaped arms 38, each having a proximate end 40 and a distal end 42. Arms 38 are connected at their proximate ends 40 in a spaced apart fashion to the rear surface 37 of elongate support 30. Arms 38 extend in a generally rearward direction from elongate support 30. An arcuate tine 44 is mounted to each arm 38 adjacent the distal end 42 thereof. Arcuate tine 44 includes a free working end 45 which works the soil during a cultivating operation.

Figures 4, 5:
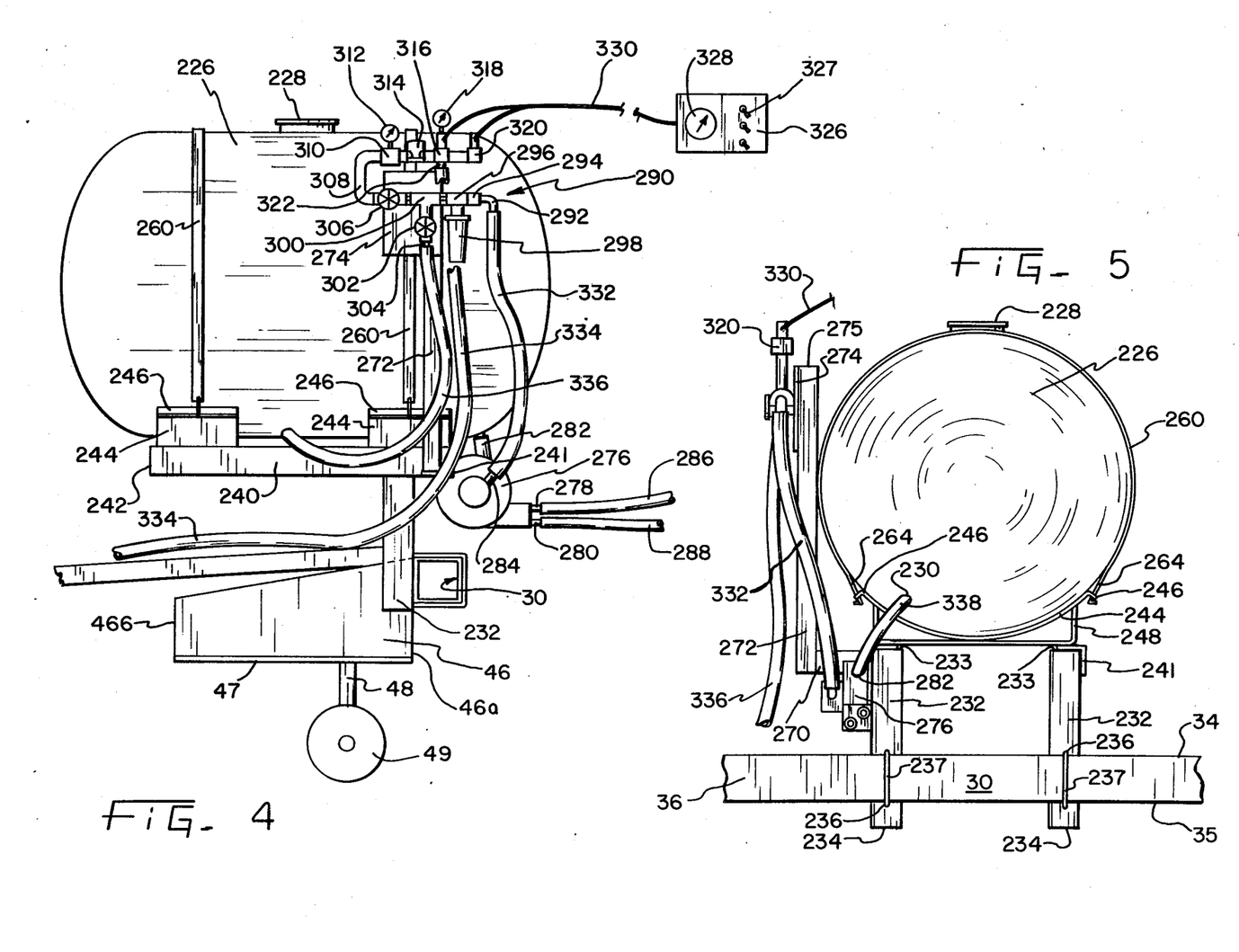
FIG. 4 is a side view of the tank of FIG. 1 illustrating the connection between the tank and farm implement, and a part of the fluid delivery system.
FIG. 5 is a front view of the tank of FIG. 1 illustrating the connection between the tank and agricultural implement, and a part of a fluid delivery system.

As illustrated in FIG. 4, cultivator 10 further includes a plurality of plates 46, each having a proximate end 46a and a distal end 46b. Plate 46 is mounted at its proximate end 46a to the rear surface 37 of elongate support 30. Plate 46 extends in generally rearward direction away from rear surface 37. Each plate 46 includes a lower flange 47 to which the top end of the wheel strut 48 is mounted. A wheel 49 is rotatably mounted adjacent to bottom end of wheel strut 48.

Cultivator 10 further includes a plurality of shield sets 50 having a pair of generally circular shields 52 and 54. Although not specifically illustrated, the shield sets 50 are mounted to cultivator 10 in such a fashion that they can be raised or lowered to fit the specific application. The mounting assembly used to mount the shield sets to the cultivator is of a conventional construction so that further description thereof is not necessary. It should be understood that the shield sets 50 are designed to be positioned on either side of the row crop. In other words, shield 52 will be on one side of its corresponding row crop and shield 54 will be on the other side of its corresponding row crop. This is specifically illustrated in schematic form in FIG. 6.

Figures 2, 3:
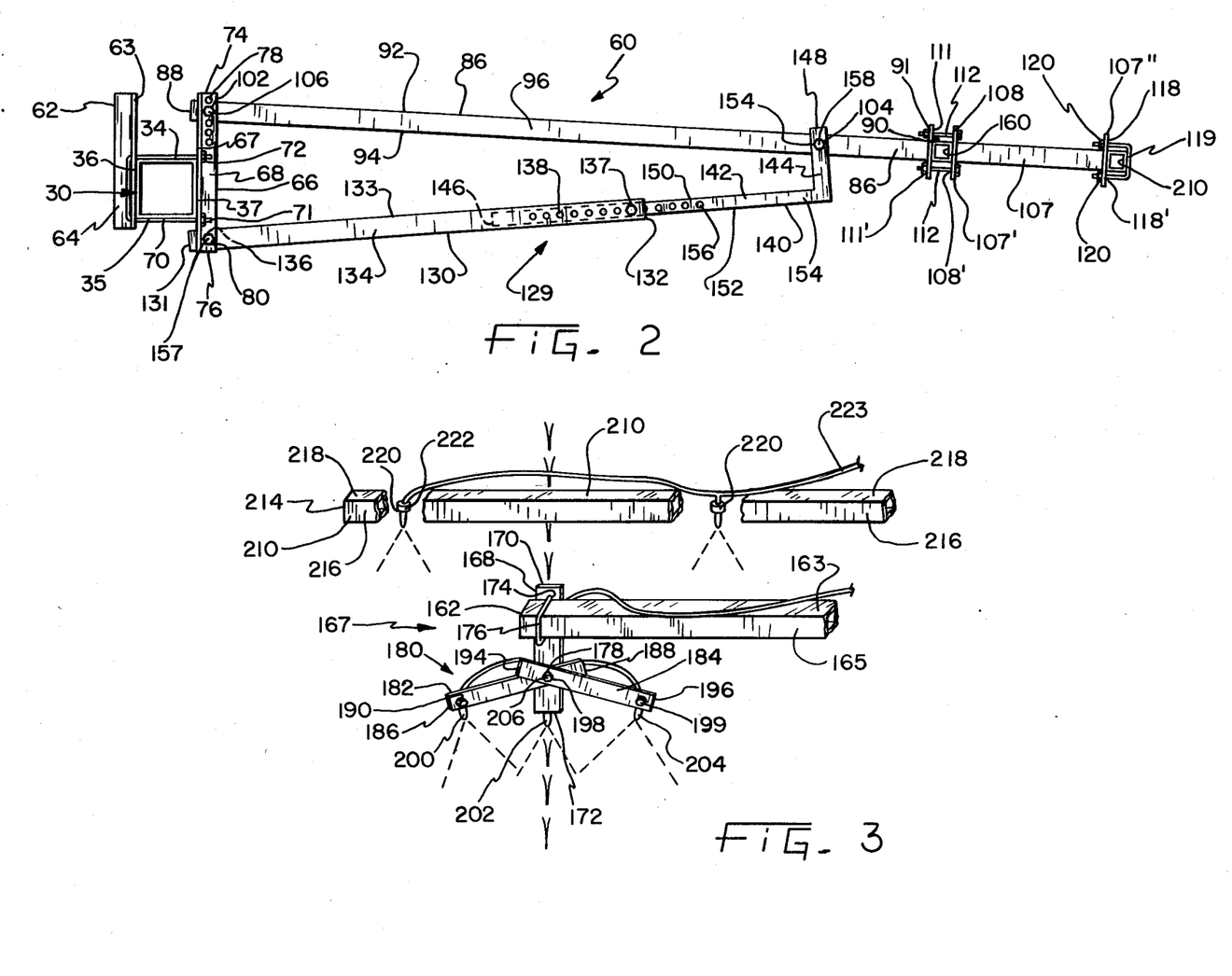
FIG. 2 is a side plan view of a mounting arm of the specific embodiment of FIG. 1 illustrating the mounting arm being connected to the agricultural implement.
FIG. 3 is a front perspective view of an end portion of the specific embodiment of FIG. 1.

Referring to FIGS. 1 and 2, a pair of mounting arms 60 are mounted to elongate support 30 so as to extend rearwardly therefrom. The structure of each mounting arm is identical so that the description of one mounting arm will suffice for that of the other mounting arm. Each mounting arm 60 includes a pair of forward upstanding L-shaped supports 62, each having normally disposed transverse and longitudinal flanges 63 and 64, respectively. Each mounting arm 60 further includes a pair of rearward upstanding L-shaped supports 66, each having normally disposed transverse longitudinal flanges 67 and 68, respectively. The forward rearward upstanding L-shape supports 62 and 66, respectively, are positioned so that their respective transverse flanges are adjacent the front and rear external surfaces 36 and 37, respectively, of elongate support 30. Transverse flanges 63 and 67 each contain corresponding apertures which enables a pair of U-shaped clamps 70 to pass between and connect these supports as illustrated in FIGS. 1 and 2. The free ends 71 of each clamp 70 extend through the corresponding apertures in the transverse flange 67 of rearward support 66. The portion of clamp 70 adjacent these free ends is threaded so as to be receivable of a nut 72. This type of clamp connection is well known by one of ordinary skill in the art so that any further description thereof is not necessary to the understanding of the invention.

Rearward support 66 further includes a top end 74 and a bottom end 76. Longitudinal flange 68 of rearward support 66 contains a plurality of vertically spaced apart apertures 78 adjacent to top end 74. This same longitudinal flange 68 also contains a pivot aperture 80 adjacent the bottom end 76 thereof.

Mountng arm 60 further includes a generally elongate rectangularly shaped hollow principal arm 86. Principal arm 86 includes opposite ends 88 and 90. A generally rectangular flange 91 is at end 90. Principal arm 86 further includes a top surface 92, a bottom surface 94, and opposite side surfaces 96. Side surfaces 96 include a pair of corresponding apertures 102 therein adjacent end 88. Side surfaces 96 further include another pair of corresponding apertures 104 positioned a selected distance forwardly of end 90. It should be appreciated that principal arm 86 is pivotally mounted to rearward support 66 by a bolt 106 passing through a selected one of aperture 78 and a pair of apertures 102 found in side surfaces 96. As can be appreciated, a selected of apertures 78 can vary so as to most appropriately suit the specific application.

Mounting arm 60 further includes an elongate distal mounting segment 107 having opposite ends with flanges 107', and 107" at the opposite ends. Flange 91 contains an aperture 111 adjacent the top thereof and another aperture 111' adjacent the bottom thereof. Flange 107' contains a top aperture 108 in geheral horizontal alignment with aperture 111 and a bottom aperture 108' in general horizontal alignment with aperture 111'. First spray head support 160 is positioned between flanges 91 and 107 ', and bolts 112 are passed through the corresponding horizontally aligned pairs of apertures. A nut 115 is then threaded onto each bolt free end 50 that support 160 is now secured to the mounting arm. Although first spray head support 160 will be described in more detail hereinafter, it is by means of the above described plate and clamp mounting assembly that first spray head support 160 is mounted to each mounting arm 60.

Flange 107" includes one aperture 118 adjacent the top end thereof and another aperture 118' adjacent the bottom end thereof. A U-shaped clamp 119 is positioned relative to flange 107" so that its free ends pass through the corresponding apertures 118 and 118'. Those portions of each U-shaped clamp adjacent is free ends are threaded so as to threadably receive a nut 120 thereon. Although second spray head support 210 will be described in more detail hereinafter, it should be appreciated that by the assembly just described second spray head support 210 can be mounted to each mounting arm 60. Second spray head support 210 is contained between the rearwardly facing surface of flange 107" and the U-shaped clamp 119.

It should be appreciated that an additional number of distal mounting segments can be attached in series. A support member such as support 160 or support 210 would be contained between adjacent flanges. One advantageous result of this feature is that a preselected number of application head groups can be mounted to the cultivator. The number of application head groups would be based upon the specific situation and limited by the ability of the mounting arm to support the weight of the application heads and their supports.

Each mounting arm 60 further includes a height adjustment assembly generally designated as 129. Height adjustment assembly 129 includes a U-shaped elongate arm 130 having opposite ends 131 and 132. Elongate arm 130 further includes a top surface 133 and opposite depending side surfaces 134. The side surfaces 134 of arm 130 include one aperture pair 136 adjacent one end 131 thereof. Side surfaces 134 of arm 130 further contain a plurality of spaced apart apertures 138 adjacent the other end 132 thereof.

Height adjustment assembly 129 further includes an L-shaped arm 140 of a generally hollow rectangular cross section. Arm 140 includes a long portion 142 and a relatively short portion 144. Long portion 142 has a distal end 146. Short portion 144 has a distal end 148. L-shaped arm 140 includes top and bottom surfaces 150 and 151, respectively, and opposite side surfaces 152. It should be appreciated that the portion of the top and bottom surfaces 150 and 151 of arm 140 adjacent end 148 are removed so that there is formed a fork section thereat. Side surfaces 152 located at the fork section further contain a pair of corresponding pivot apertures 154 therein. Side surfaces 152 of arm 140 further contain a plurality of spaced apart apertures 156 adjacent distal end 146.

Referring specifically to FIG. 2, elongate arm 130 is pivotably connected to rearward support 66 by a bolt 157 passing through aperture 80 in support 66 and apertures 136 contained in arm 130. L-shaped arm 140 is pivotably connected adjacent its end 148 by a bolt 158 passing through apertures 154 and aperture pair 104 contained in arm 96. The position of L-shaped arm 140 relative to elongate arm 130 can be varied by matching apertures 138 with any one of a plurality of aperture pairs 156. It should be appreciated that the adjustability of arm 130 relative to arm 140 provides for varying height of both first spray head support 160 and the second spray head support 210 from the row crops. It should further be mentioned that the spacing between apertures 138 is slightly smaller than the spacing between apertures 156.

For example, apertures 138 are spaced 1½ inches apart and apertures 156 are spaced 1⅝ inches apart. This staggered spacing arrangement provides for an increased precision in adjusting the height of the spray head supports. This adjustment feature will be described in more detail hereinafter in connection with the specific structure of mounting arm 160 with specific reference to FIGS. 7a through 7c.

Referring more specifically to FIGS. 1 and 3, the first spray head support 160 is of a generally hollow rectangular cross section and has opposite ends 161 and 162. First spray head support 160 further includes a top surface 163, a bottom surface 164, a forward side surface 165 and a rearward side surface 166. The row bander and its associated mounting assembly is generally designated as 167. The mounting assembly includes a generally rectangularly shaped mounting plate 168 having a top end 170 and a bottom end 172. A pair of vertically spaced apart apertures 174 are contained in plate 168 adjacent to top end 170 thereof. The mounting assembly further includes a U-shaped clamp 176 having free ends 177. Free ends 177 pass through apertures 174 so that the row bander/mounting assembly 167 is detachably mounted to the first spray head support 160. Plate 168 contains an aperture 178 near bottom end 172 thereof. As will be appreciated, it is by aperture 178 that the row bander is connected to mounting plate 168.

The row bander is generally designated as 180. Row bander 180 includes a pair of generally elongate arms 182 and 184. Arm 182 includes opposite ends 186 and 188 and contains therein an aperture 190 adjacent end 186 and another aperture (not illustrated) adjacent end 188. Arm 184 includes opposite ends 194 and 196 and contains therein an aperture 198 adjacent end 194 and another aperture 199 adjacent end 196. The row bander is mounted to mounting plate 168 by aligning apertures 198 and 178 of arm 184 and plate 168 respectively, and the unillustrated aperture of arm 182 and passing a threaded bolt 206 or other suitable connector therethrough. A nut (not illustrated) is threadedly received on the free end of bolt 206. One spray head 200 is connected to arm 182 at aperture 190, another spray head 202 is connected to the bottom end 172 of mounting plate 168, and a third spray head 204 is connected to arm 184 at aperture 199.

It should be appreciated that the arms 182 and 184 can be pivoted with respect to one another so as to provide for the selection of the direction of the spray of spray heads 200 and 204. The degree of pivot can vary to suit the specific requirements of the situation. Arms 182 and 184 can be fixed relative to one another and to plate 170 by tightening the nut threadedly received by bolt 206.

Mounting arm 60 further includes an square-shaped second spray head support 210 having opposite ends 212 and 214. Second spray head support 210 includes a pair of generally vertically disposed surfaces 216 and a pair of generally horizontally disposed surfaces 218. A plurality of spray heads 222 are clamped to support 210. A fluid delivery line 223 fluidly connects the spray heads. The result is that second spray head support 210 carries a plurality of generally spaced apart spray heads 222 disposed in a direction generally transverse to the direction of movement of the tractor 12 along the crop rows. It should be appreciated that the spray heads are visually perceivable by the operator sitting in the seat when he looks to the rear of the tractor. The operator can thus effectively monitor the operation of the spray heads from the tractor seat. If a problem such as a clogged spray head or loose spray head occurs, it can be quickly realized and then corrected.

Referring to FIGS. 1, 4 and 5, there is illustrated in these figures the general fluid delivery system. The fluids delivery system includes a generally cylindrical tank 226 having an inlet 228 at the top and an outlet 230 near the bottom thereof. Tank 226 can be made of a plastic or other suitable material that will withstand any harmful interaction with agricultural chemicals typically contained therein.

The structure which mounts tank 226 to cultivator 10 includes a pair of upstanding beams 232. Each beam includes opposite top end 233 and opposite bottom end 234. Each beam 232 includes a forwardly facing surface 235 in which is contained a pair of apertures 236 adjacent bottom end 234. A U-shaped clamp 237 is positioned around support member 30 so that the free ends (not illustrated) thereof pass through apertures 236. U-shaped claim 237 is threaded adjacent its free ends (not illustrated) thereof so that free ends threadedly receive a nut so as to securely mount the upstanding beams 232 to support 30.

An L-shaped support 240 is affixed, such as by welding or the like, to top end 233 of beam 232. L-shaped support 240 has opposite ends 241 and 242. A pair of U-shaped pans 248 are affixed, such as by welding or the like, to L-shaped supports 240. A pair of corresponding arcuate holders 244 having flanges 246 at the opposite ends thereof are affixed such as by welding or the like to U-shaped pan 248 as illustrated in FIG. 5. It can be appreciated that the curvature of arcuate holders 244 is such so that it corresponds to the curvature of tank 226. Tank 226 rests within the concave surfaces of arcuate holders 244. It should be noted that the flanges 246 each contain therein an aperture. A strap 260 extends between the opposite flanges of arcuate holder 244 and is connected to the arcuate holder 244 by a hook 264 which passes through the corresponding aperture in flange 246. Straps 260 facilitate retaining tank 226 in position.

There is a generally horizontally disposed mounting arm 270 having one end connected to its corresponding upstanding beam 232 and the other end thereof connected to a generally vertically disposed arm 272. A generally rectangular mounting plate 274 is attached to vertical arm 273 adjacent the upper end 275 thereof.

A pump 276 is mounted to the cultivator 10. Pump 276 includes a hydraulic control input 278 and the hydraulic control output 280. Pump 276 further includes a pump inlet 282 and a pump outlet 284. One control hose 286 connects hydraulic control input 278 with the tractor hydraulic control system and another control hose 288 connects hydraulic output 280 with the tractor hydraulic control system. The tractor hydraulic control system is of a conventional construction, and as can be appreciated, the operation of pump 276 can be controlled by the operator of the tractor while sitting in the seat. Pump 276 and the hydraulic control system are of a conventional construction so that further description thereof is not necessary to an understanding of the invention.

The fluid delivery system further includes a fluid regulation assembly generally designated as 290. Fluid assembly 290 includes an inlet fitting 292 connected to one end of hose 294 which, in turn, is connected to a T-fitting 296. A pressure regulator 298 is connected to another end of T-fitting 296. The third end of T-fitting 296 is connected to a T-fitting 300 which has a valve 302 connected to a second end thereof with the third end of T-fitting 300 being connected to another valve 306. A hose connects valve 306 with pressure indicator 310 having a dial 312. Pressure indicator 310 is connected to a filter 314 which, in turn, is connected to a pair of electrically controlled valves 316 and 320. Valve 316 includes a pressure dial indicator 318 operatively connected thereto.

A control box 326 having a plurality of switches 327 and a dial indicator 328 is mounted to the fender 14 of tractor 12. Control 326 is connected to valves 316 and 320 by electrical lines 330. It can thus be appreciated that the operator while sitting in the seat can control the fluid flow through valves 316 and 320 by means of control 326. Line 334 connects valve 316 with the various fluid delivery lines delivering fluid directly to the spray heads. Hose 332 connects the outlet 284 of pump 276 with fitting 292. Hose 336 carries the fluid returned from the spray heads to inlet 304 to valve 302. Hose 338 fluidly connects the outlet 230 of tank 226 with the pump inlet 282. It can thus be appreciated that there is provided a complete recirculating fluid delivery system in which the operation of the pump 276 is hydraulically controlled by the operator as well as the valving which regulates the pressure within the tank as well as the whole system can be controlled by the operator via control 326.

By providing an operator-controlled system, the row crop field can be treated in a very localized fashion. Selected portions of the field can be only cultivated, other portions of the field can be cultivated and treated with agricultural chemical, and other portions can be only treated with chemical.

Figure 7A:
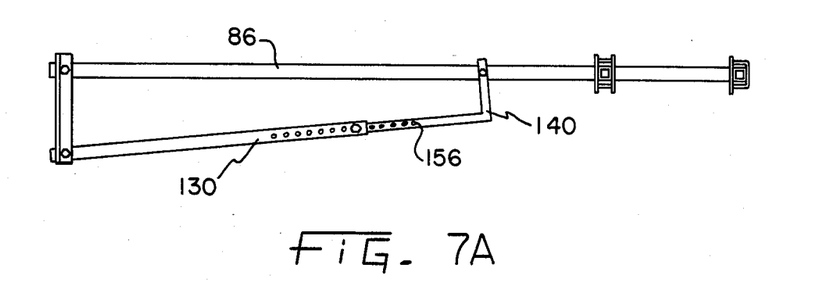
FIGS. 7A through 7C are side mechanical schematic views illustrating the mounting arm in a level, a raised and a lowered position.
Figure 7B:
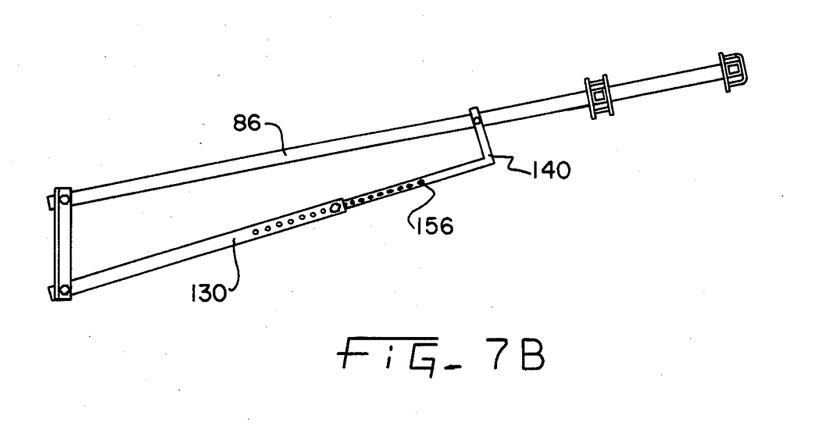

The general operation of the height adjustment assembly 129 is shown with specificity in FIGS. 7A, 7B and 7C. In FIG. 7A the height adjustment assembly is shown with five apertures 156 being visible on L-shaped arm 140. In FIG. 7B, L-shaped arm 140 has been extended out from the position illustrated in FIG. 7A so that eight apertures 156 are visible. As can be appreciated, this extension causes end 90 of arm 86 to move upwardly. The result of this is that the first and second spray head supports are a greater distance from the crops in FIG. 7B than in FIG. 7A.

Figure 7C:
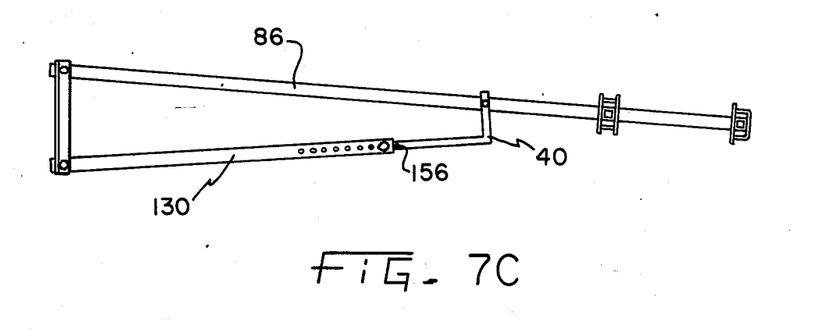

Referring to FIG. 7C, it is apparent that L-shaped arm has been received within arm 130 so that only one aperture 156 is visible. The result of this contraction is that end 90 of arm 86 is lowered so that first and second spray head supports are closer to the ground in FIG. 7C than in either of FIGS. 7A or 7B. It should thus be appreciated that applicant has provided an improved height adjustment assembly. This height adjustment assembly provides for selecting a plurality of positions of the spray heads relative to the soil. The height adjustment assembly is also relatively easy to change so that it can be done efficiently in the field or in the barn. It does not require a lot of labor to make the height adjustments.

Figure 8:
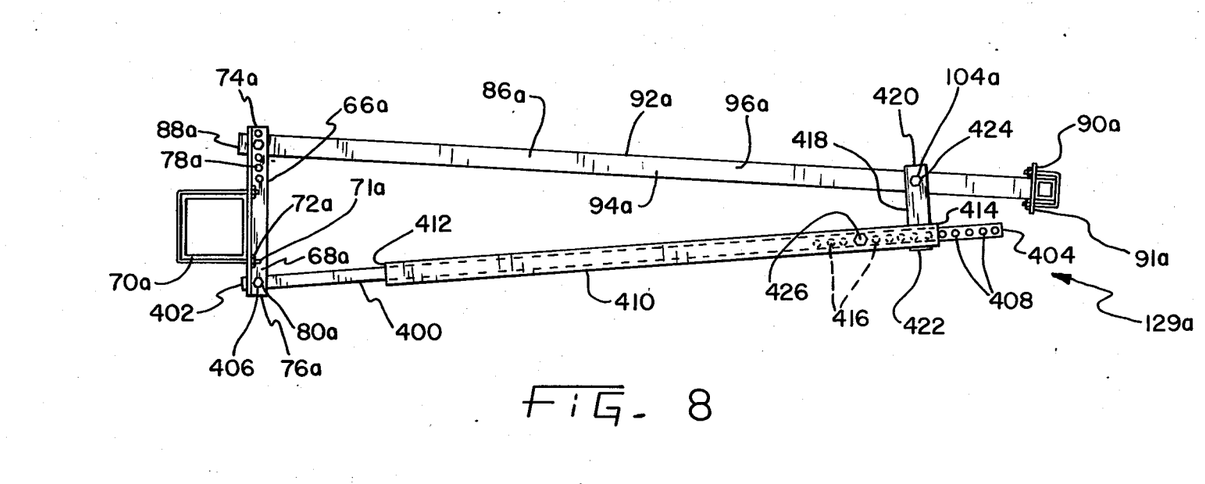
FIG. 8 is a side plan view of an alternate specific embodiment at the mounting arm.
Figure 9:
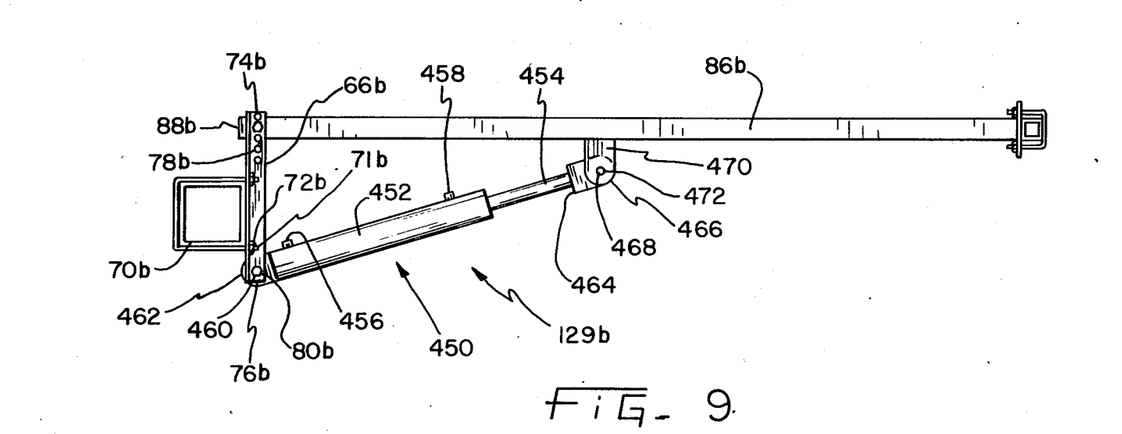
FIG. 9 is a side plan view of another alternate specific embodiment of the mounting arm.

Two alternate specific embodiments of the mounting arm are illustrated in FIGS. 8 and 9. The difference between the mounting arms lies in the height adjustment feature. Thus, elements that common between the specific embodiments will be designated with the same reference numeral only a subscript "a" for the specific embodiments illustrated in FIG. 8, and the subscript "b" for the specific embodiment illustrated in FIG. 9.

The adjustment feature 129a of the specific embodiment illustrated in FIG. 8 includes an elongate bar 400 having opposite ends 402 and 404. Bar 400 contains an aperture 406 therein adjacent end 402. Bar 400 further contains a plurality of apertures 408 adjacent and spaced apart from end 404 thereof. Height adjustment assembly 129a further includes a hollow elongate member 410 having opposite ends 412 and 414. Member 410 includes a plurality of serially spaced apart apertures 416 adjacent end 414 thereof. A bracket 418 includes top end 420 and bottom end 422. Bracket 418 contains an aperture 424 therein adjacent top end 420. Bracket 418 is pivotally mounted to an elongate member 86a by bolt 104a that passes through aperture 424 and the corresponding aperture contained in member 86a. Element 410 is attached to bracket 418 adjacent the bottom end 422 thereof. It can thus be appreciated that bar 400 slides within member 410, and by virtue thereof the height of the spray head support relative to the crops can be varied. Once a height has been selected whereby apertures 408 and 416 correspond, the height adjustment feature 129a can be secured and positioned by passing a bolt 426 through a corresponding apertures.

Referring to FIG. 9, there is illustrated another specific embodiment of the mounting arm including a piston-cylinder operated height adjustment feature 129b. Height adjustment feature 129b includes a piston-cylinder arrangement generally designated as 450. Piston-cylinder arrangement 450 includes an cylinder 452 in which is slidably contained a piston 454. Cylinder 452 includes fluid inlet 456 and a fluid outlet 458. A mounting aperture 460 is contained at the free end of 462 of cylinder 452. Aperture 460 is aligned with aperture 80b and a bolt passed therethrough so that the cylinder is pivotly mounted to bracket 66b. The free end 464 of piston rod 454 includes a bracket 466 thereat. Bracket 466 further includes an aperture 468. Mounting assembly 129b further includes a bracket 470 mounted to elongate arm 86b. Bracket 470 includes an aperture 472. Aperture 472 is aligned with aperture 468 and a bolt passed therethrough so that piston rod 454 is pivotly mounted to arm 86b. It can thus be appreciated that depending upon the extention or retraction of the the piston-cylinder assembly, the spray head support can be varied as to its height above the row crop.

Figure 6:
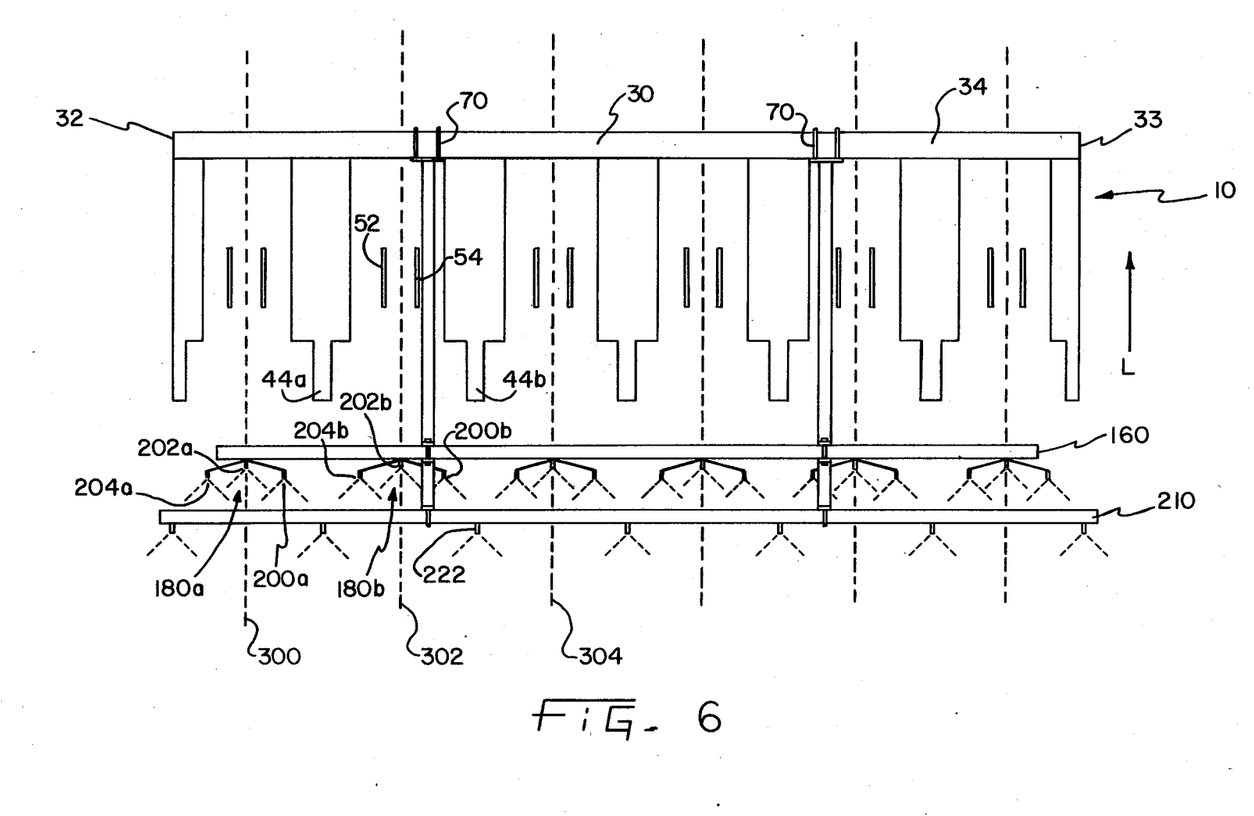
FIG. 6 is a top mechanical schematic view illustrating the relationship between the farm implement, mounting assembly and the application heads.

Referring more specifically to FIG. 6, there is illustrated a mechanical schematic view which depicts the operation of a farm implement utilizing the mounting apparatus to attach two generally parallel rows of spray heads to the implement. The operation of the agricultural implement in combination with the spray heads will be described for the strip between row crops 300 and 302 and for row crop 302 itself. Generally speaking, it should be understood that rows 300 and 302 are spaced approximately 30 inches apart and the width of rows 300 and 302 can vary between 20 inches and 40 inches. The operation of entire combination of the implement and spray heads in a post-emergence environment will become apparent from the below description.

Spray head 204a applies agricultural chemical in a path down the left side of the crop row 302. Spray head 202a applies agricultural chemical in a path down the center of crop row 302. Spray head 200a applies agricultural chemical in a path down the right side of crop row 302. As can be appreciated, the spray heads 204a, 202a and 200a apply agricultural chemical so as to completely cover the row crop. Cultivator tine 44a is positioned so as to work the mediate 15 inches of the soil between row crops 300 and 302.

It should be appreciated that in the above-described situation all of the spray heads 204a, 202a and 200a are turned on so that they all apply chemical. Although not illustrated, conventional structure is used to permit or prevent flow through the spray heads. Depending on the requirements of the situation, any combination of the spray heads can be used to apply chemical to the crops.

Spray head 222 may be either a conventional spray head where liquid is fed from a tank or a rope wick type of application head. A rope wick is a conventional type of application head wherein a storage container has chemical stored therein. A wick, such as a rope, communicates with the chemical so as to soak it up. The wick upon contacting the undesirable plant wipes the chemical onto that plant.

In either instance, the spray head 222 is positioned between the row crop. The spray head applies agricultural chemical either through spraying or in the case of a rope wick, through direct physical contact to the undesirable plant contained in the space or row between the crop rows. By mounting the rope wick behind the tractor and cultivators there is no chance that the tractor or implement will rub the chemical off onto the undesirable plant.

It can thus be appreciated where applicant has provided a mounting assembly which provides for the cooperative operation of a farm implement such as a cultivator with a plurality of spray heads for applying agricultural chemical. In this particular environment, the cultivator and spray heads operate together to provide an efficient economical post-emergence working of row crops.

In a reduced tillage, or so-called "no till" situation, the operator is attempting to reduce the extent to which he works the soil. In the no till situation, the operator, prior to planting, will form a ridge in the soil. This is usually done in the Fall. In the Spring, a planter is used to plant seed in these ridges. It should be appreciated that applicant's mounting assembly can be mounted to a planter so that the spray heads extend rearwardly of the planter. Agricultural chemical can then be applied directly to the ridged soil after planting. The crop can be planted and treated in one pass.

While there have been described above the principles of this invention in connection with specific apparatus, it is to be clearly understood that this description is made only by way of example and not as a limitation to the scope of the invention.

What is claimed is:

1. An apparatus for mounting a plurality of fluid spray heads to an agricultural implement pulled by a tractor and used in row crop farming wherein the implement includes a frame having a generally transversely disposed frame support member and a plurality of row crop working devices mounted to the frame support member, the apparatus comprising:

a mounting fixture mounted at one end thereof to the frame support member, the other end of said mounting fixture extending rearwardly of the implement so as to be positioned to the rear of the row crop working devices;

an elongate mount support attached to said mounting fixture adjacent the other end thereof and positioned rearwardly of the row crop working devices, said mount support disposed generally transversely to the longitudinal direction of the row crops, said mount support receivable of the fluid spray heads in a spaced-apart fashion along the length of said mount support whereby the spray heads and row crop working devices cooperate to perform a farming operation on the row crop; and said mounting fixture further including height adjustment means for selecting the vertical position of all the spray heads relative to the row crop, said mounting fixture including a bracket directly connected to said elongate mount support, an elongate arm pivotally mounted at one end to said bracket, a pair of outer and inner telescoping members each having a distal end, said outer member pivotally mounted at said distal end thereof to said bracket, said inner member pivotally mounted at said distal end thereof to said arm, and said outer and inner members each having a connected end at which they are telescopically connected so that the relative positioning between the inner and outer members determines the vertical distance between the spray heads and the row crops, said bracket including a plurality of spaced-apart vertically disposed apertures, and said elongate arm containing an aperture adjacent said one end thereof, said elongate arm being positionable to any one of a plurality of positions corresponding to said arm aperture being aligned with a selected one of each of said bracket apertures.

2. The apparatus of claim 1 wherein said inner member is L-shaped.

3. The apparatus of claim 1 wherein each of said inner and outer members contain a plurality of spaced-apart apertures adjacent the connected ends thereof, said inner and outer members being relatively positionable to one of a plurality of positions so that a selected aperture on each member is aligned, and a connector passing through said aligned apertures.

4. The apparatus of claim 3 wherein the spacing between said apertures in said inner member is different than the spacing between said apertures in said outer member.

5. The apparatus of claim 3 wherein the spacing between said apertures in said inner member is greater than the spacing between said apertures in said outer member.

6. The apparatus of claim 1 wherein said fluid spray heads are positioned so that each of said fluid spray heads is in general vertical alignment above its corresponding row crop.

7. The apparatus of claim 1 further including:

a second elongate mount support attached to said mounting fixture at the other end thereof so as to be spaced rearwardly of said other elongate mount support, said second mount support being generally parallel to said other mount support, and said second mount support receivable of additional fluid spray heads in a spaced-apart fashion along the length of said second mount support.

8. The apparatus of claim 7 wherein each of said additional fluid spray heads is in general vertical alignment above the soil between each adjacent corresponding row crop.

9. An agricultural implement for cultivating and applying a reactive substance to generally longitudinally disposed rows of crops comprising:

an implement frame including an elongate frame support, a plurality of spaced-apart cultivator shovels for working the soil between the rows being mounted to said frame support;

a tank mounted to said implement frame;

a pair of adjustable mounts each having opposite ends, each of said mounts attached at one of said ends to the frame supports, the other of said ends extending rearwardly so as to be positioned rearwardly of said cultivator shovels;

a spray head support attached to said adjustable mounts adjacent the other ends thereof, a plurality of spray heads mounted to said spray head support in a spaced-apart fashion so that each spray head is generally vertically disposed over its corresponding crop rows;

a substance delivery means for delivering the reactive substance between said tank and spray heads; and each of said adjustable mounts including means for setting the generally vertical height of said spray heads relative to the crop rows;

each of said adjustable mounts include: an elongate arm attached at one end thereof to the frame support and a flange at the other end thereof, and a distal mounting arm having a flange at each of the opposite ends thereof, said spray head support sandwiched between the elongate arm flange and one of said distal mounting arm flanges; and a second spray head support, and a clamp assembly attaching the second spray head support to the other distal mounting arm flange.

* * * * *